(12) United States Patent
Philippe et al.

(10) Patent No.: US 10,674,147 B2
(45) Date of Patent: Jun. 2, 2020

(54) IMAGE DATA ENCODING AND DECODING

(71) Applicant: Sony Corporation, Tokyo (JP)

(72) Inventors: Magali Kimlee Miri Philippe, Basingstoke (GB); Nicholas Ian Saunders, Basingstoke (GB); Karl James Sharman, Newbury (GB)

(73) Assignee: Sony Corporation, Tokyo (JP)

( * ) Notice: Subject to any disclaimer, the term of this patent is extended or adjusted under 35 U.S.C. 154(b) by 31 days.

(21) Appl. No.: 15/826,911

(22) Filed: Nov. 30, 2017

(65) Prior Publication Data

US 2018/0160114 A1 Jun. 7, 2018

(30) Foreign Application Priority Data

Dec. 7, 2016 (GB) .................... 1620815.9

(51) Int. Cl.
| | | |
|---|---|---|
| *H04N 19/129* | (2014.01) | |
| *H04N 19/107* | (2014.01) | |
| *H04N 19/91* | (2014.01) | |
| *H04N 19/117* | (2014.01) | |
| *H04N 19/157* | (2014.01) | |
| *H04N 19/18* | (2014.01) | |
| *H04N 19/186* | (2014.01) | |

(52) U.S. Cl.
CPC ......... *H04N 19/107* (2014.11); *H04N 19/117* (2014.11); *H04N 19/129* (2014.11); *H04N 19/157* (2014.11); *H04N 19/18* (2014.11); *H04N 19/91* (2014.11); *H04N 19/186* (2014.11)

(58) Field of Classification Search
CPC .................................................. H04N 19/129
See application file for complete search history.

(56) References Cited

U.S. PATENT DOCUMENTS

| | | | | |
|---|---|---|---|---|
| 2008/0310745 A1* | 12/2008 | Ye | ......... | H04N 19/503 382/238 |
| 2010/0124284 A1* | 5/2010 | Lee | ....... | H04N 19/139 375/240.18 |
| 2013/0051459 A1* | 2/2013 | Kirchhoffer | ........... | H04N 19/50 375/240.07 |

* cited by examiner

*Primary Examiner* — Jeffery A Williams
(74) *Attorney, Agent, or Firm* — Oblon, McClelland, Maier & Neustadt, L.L.P.

(57) ABSTRACT

An image data encoding and/or decoding apparatus comprises a data processor to process an image data signal comprising successive arrays of data values according to respective data value processing orders associated with the arrays of data values; and a processing order selector to select a processing order for processing a current array of data values in dependence on one or more attributes of a plurality of arrays of data values in the image data signal already processed by the data processor.

27 Claims, 12 Drawing Sheets

| Intra Mode | Planar | DC | Horizontal | | | | | | | | | | | | | | | | Vertical | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
| Set Nb | 0 | 1 | 2 | 4 | 5 | 6 | 7 | 8 | 9 | 10 | 3 | 10 | 9 | 8 | 7 | 6 | 5 | 4 | 2 | 4 | 5 | 6 | 7 | 8 | 9 | 10 | 3 | 10 | 9 | 8 | 7 | 6 | 5 | 4 | 2 |

Used with transposed data (modes 18–34)

FIG. 17 ns using so-called macroblocks, each of which is used as a region of comparison with

IMAGE DATA ENCODING AND DECODING

CROSS REFERENCE TO RELATED APPLICATIONS

The present application claims priority to United Kingdom Application 1620815.9 filed on Dec. 7, 2016, the contents of which being incorporated herein by reference in its entirety.

BACKGROUND

Field

This disclosure relates to image encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several image or video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Current video codecs (coder-decoders) such as those used in H.264/MPEG-4 Advanced Video Coding (AVC) achieve data compression primarily by only encoding the differences between video images. These codecs use so-called macroblocks, each of which is used as a region of comparison with a corresponding macroblock in a previous video frame, and the image region within the macroblock is then encoded according to the degree of motion found between the corresponding current and previous macroblocks in the video sequence, or between neighbouring macroblocks within a single frame of the video sequence.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 M bit/s.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 17 is a schematic mapping table;

DESCRIPTION OF THE EMBODIMENTS

Figure 1:
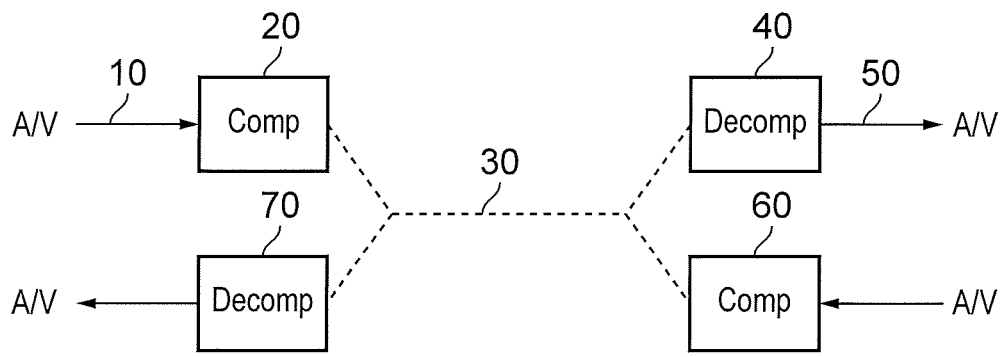
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the disclosure.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments of the present disclosure.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
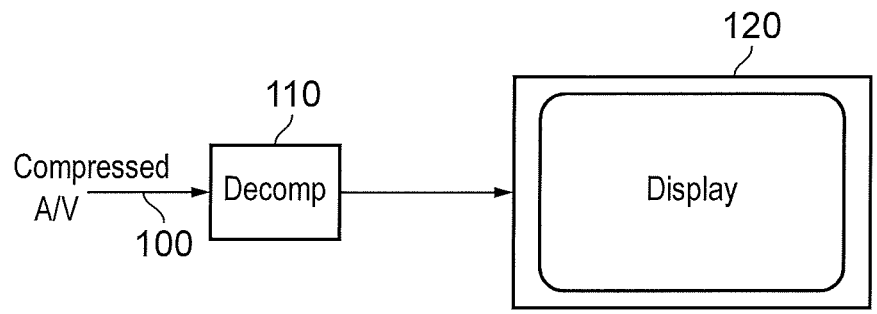
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 may be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
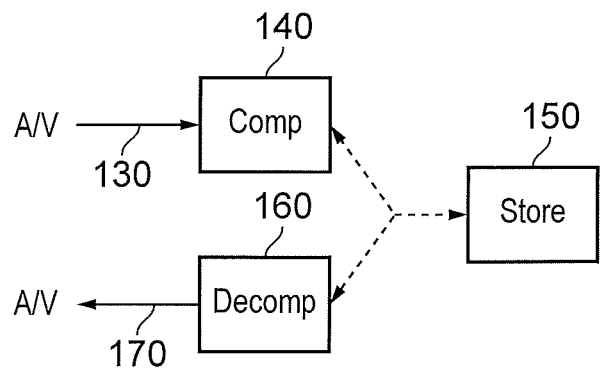
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium storing that signal, are considered as embodiments of the present disclosure.

Figure 4:
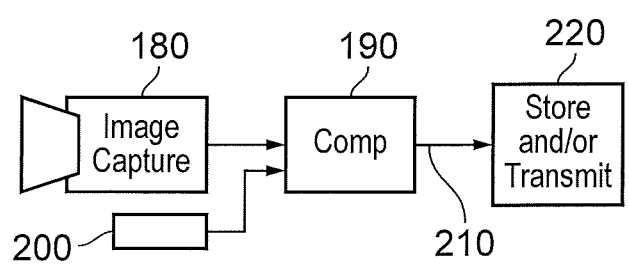
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

Therefore, it will be appreciated that encoding and/or decoding apparatus as discussed here can be embodied in video storage, transmission, capture or display apparatus.

The techniques to be described below relate primarily to video data compression and decompression. However, they can be applied to image data compression and decompression. Examples include the intra-image techniques to be discussed, which can be applied to single images. In this context, references in the description of the embodiments to "video" should be understood, where the context does not explicitly disallow such an interpretation, to relate also to "image" handling techniques.

It will also be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video or image data. That is to say, the embodiments can apply to video data compression without necessarily having any associated audio data handling at all.

Figure 5:
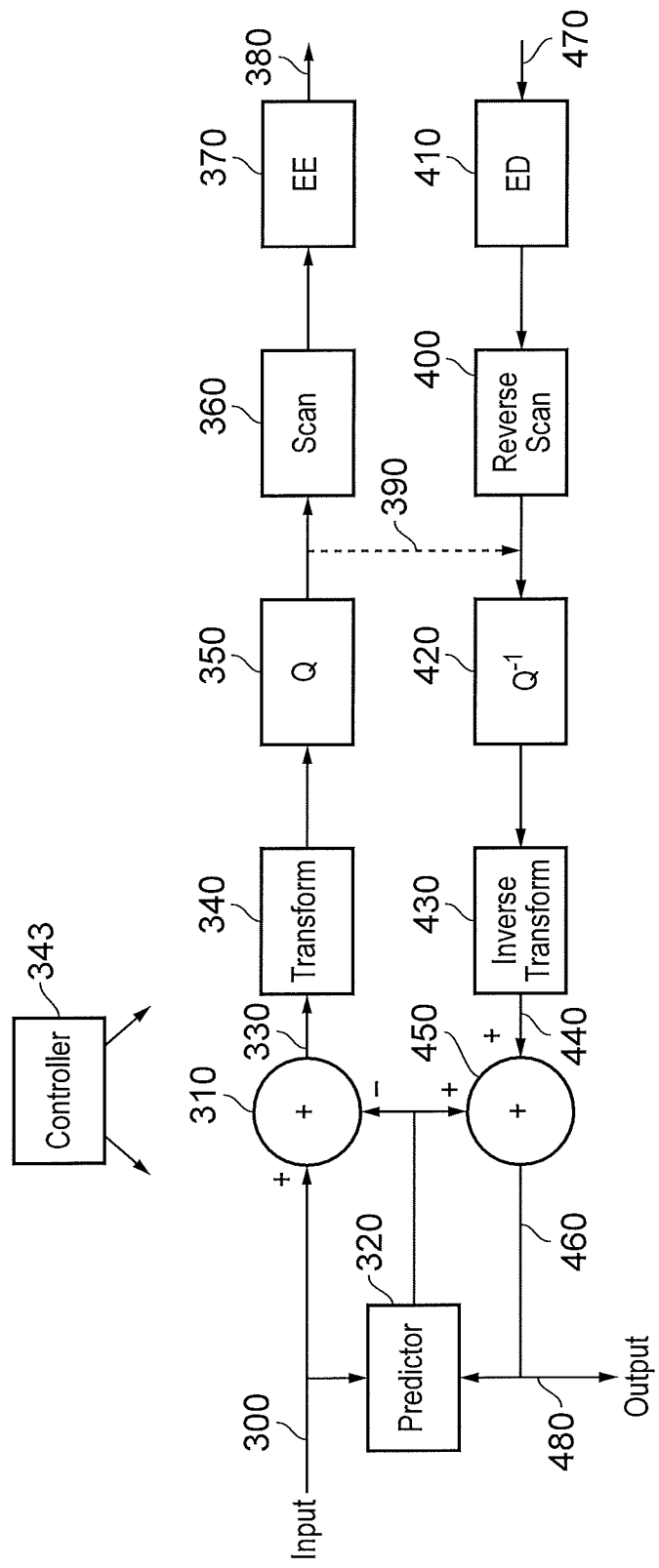
FIG. 5 provides a schematic overview of a video data compression and decompression apparatus.

FIG. 5 provides a schematic overview of a video data compression and decompression apparatus.

A controller 343 controls the overall operation of the apparatus and, in particular when referring to a compression mode, controls the trial encoding processes (to be described below) to select various modes of operation such as sample block sizes and/or configurations.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) or other transformed representation (such as a discrete sine transform or DST representation) of the residual image data. The DCT technique itself is well known (as is the DST technique) and will not be described in detail here. Optionally, one or more further transform stages may be included in the overall processing. Such other transform stage(s) may be implemented before, as part of, and/or after the quantisation processing.

In other modes of operation, an arrangement referred to as "transform skip" may be used, in which a transform is not applied to the samples. However, for convenience of processing, a "rotation" can be applied in these circumstances to reorder the data. In the description which follows, the resulting data (as passed to the next stage of processing) will be referred to, for convenience, as transformed data, even if the transform skip mode has been used.

The output of the transform unit 340, which is to say, a set of transformed coefficients for each transformed block of image data, is supplied to a quantiser 350.

Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A particular mode of operation can omit the quantisation process, referred to here as a quantisation bypass mode. However, for ease of description, the resulting data passed to the next stage of processing will be referred to in the description below as quantised data even if the quantisation process has been omitted.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order, although in example embodiments to be discussed below, other scanning orders will be considered.

In some arrangements such as MPEG4-SStP, coefficients are scanned from the low to high frequency (in a zig-zag scan), and the entropy coder preferred coefficients monotonically decreasing in magnitude. In HEVC, although the scans are defined from low to high frequency, the coefficients are actually scanned from high to low, as the entropy coder prefers coefficients monotonically increasing in magnitude. The present examples encompass each of these arrangements. (An example to be discussed below with reference to FIG. 9 uses a low frequency to high frequency scan).

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Figure 6:
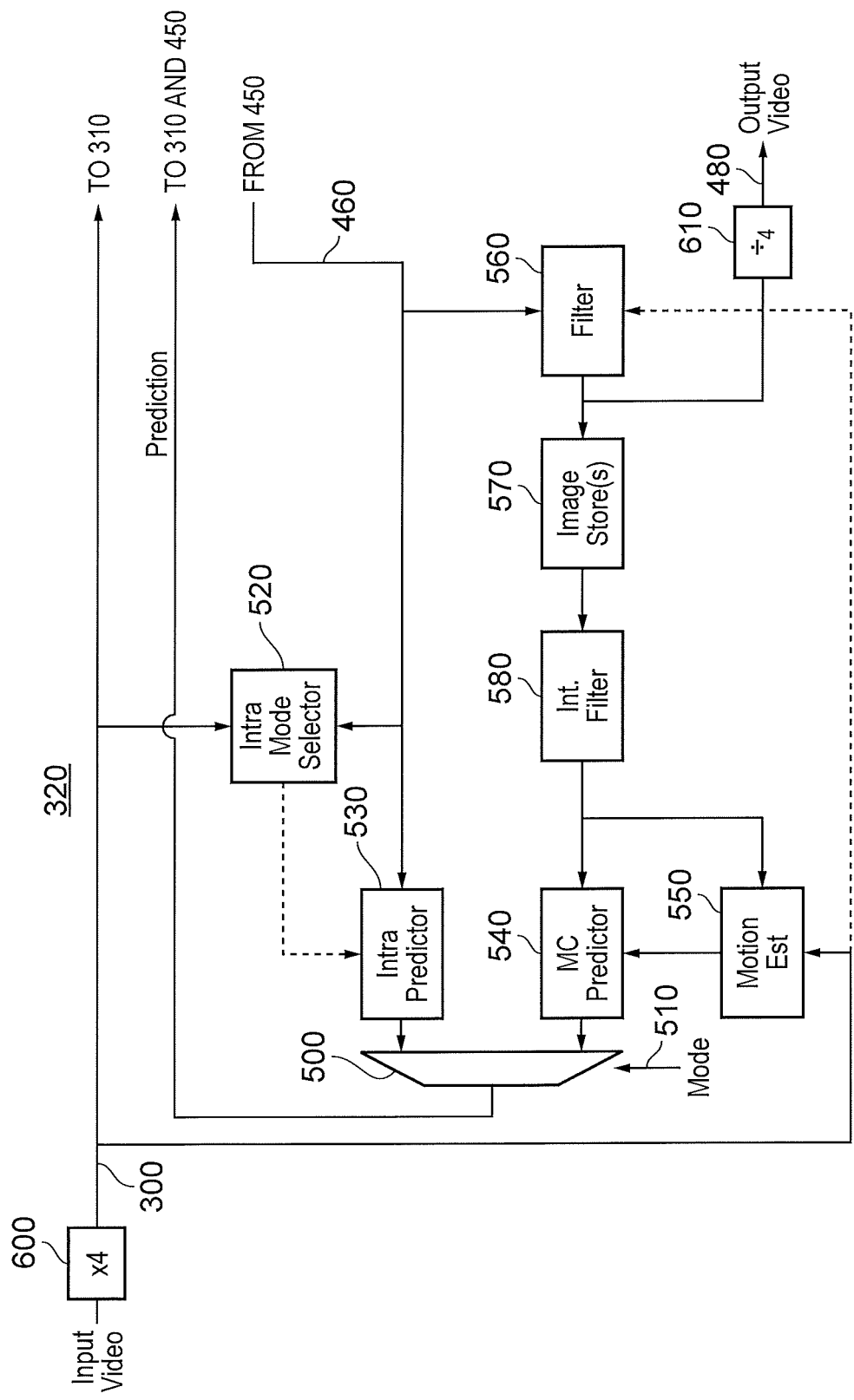
FIG. 6 schematically illustrates the generation of predicted images.

The apparatus of FIGS. 5 and 6 can act as a compression (encoding) apparatus or a decompression (decoding) apparatus. The functions of the two types of apparatus overlap very heavily. The scan unit 360 and entropy encoder 370 are not used in a decompression mode (and may therefore not be present in a decompression apparatus), and the operation of the predictor 320 (which will be described in detail below) and other units follow mode and parameter information contained in or otherwise associated with the received compressed bit stream rather than generating such information themselves. The techniques described below for prediction of a scan pattern are used at both the encoding and decoding sides, based upon the same source data.

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments of the disclosure the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice may be made in dependence upon which selection gives the lowest "energy" (which, as discussed above, may be considered as information content requiring encoding), and the choice is signalled to the encoder within the encoded output data stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other arrangements, the selection can be by a consideration of the trade-off between the cost (in bits) of encoding the decision and associated data and the resulting distortion (picture quality) (sum-square-of-error). A Lagrangian multiplier method (lambda) can be used to convert the two dimensional problem (bits, distortion) into a problem with a single score.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction. The processing applied to the signal 460 will now be described. Firstly, the signal is filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

Adaptive filtering represents in-loop filtering for image restoration which can be enabled or not enabled on a block by block basis.

The filtered output from the filter unit 560 in fact forms the output video signal 480 when the apparatus is operating as a compression apparatus. It is also buffered in one or more image or frame stores 570; the storage of successive images is a requirement of motion compensated prediction inter-image processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

In embodiments of the disclosure, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

Figure 7:
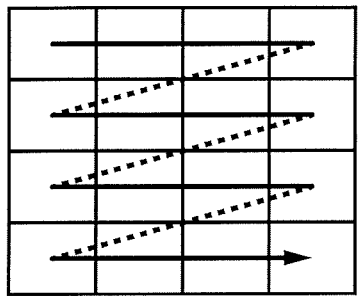
FIGS. 7 to 9 schematically illustrate example scan patterns.
Figure 8:
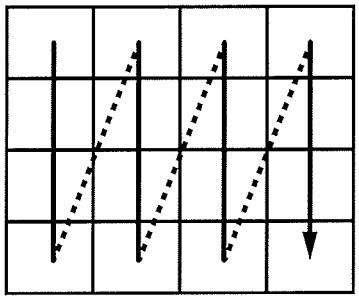
Figure 9:
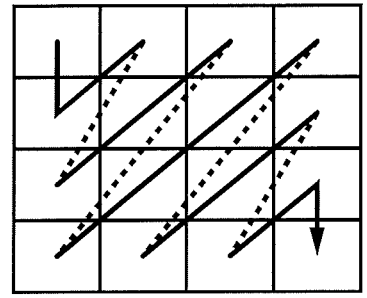

FIGS. 7 to 9 schematically illustrate scan patterns in respect of a 4×4 block.

The scan pattern is used to derive an order by which frequency-separated or transformed coefficients are processed. Three examples are shown. These are: a horizontal scan pattern (FIG. 7), a vertical scan pattern (FIG. 8) and an up-right diagonal scan pattern (FIG. 9).

In a previously proposed arrangement, a scan pattern is selected from a group of two or more candidate scan patterns in dependence upon the prediction mode in use.

The previously proposed example concerns a group of three candidate scan patterns, the up-right diagonal pattern, the horizontal pattern and the vertical pattern. But a different group of two or more candidate patterns could be used.

Figure 10:
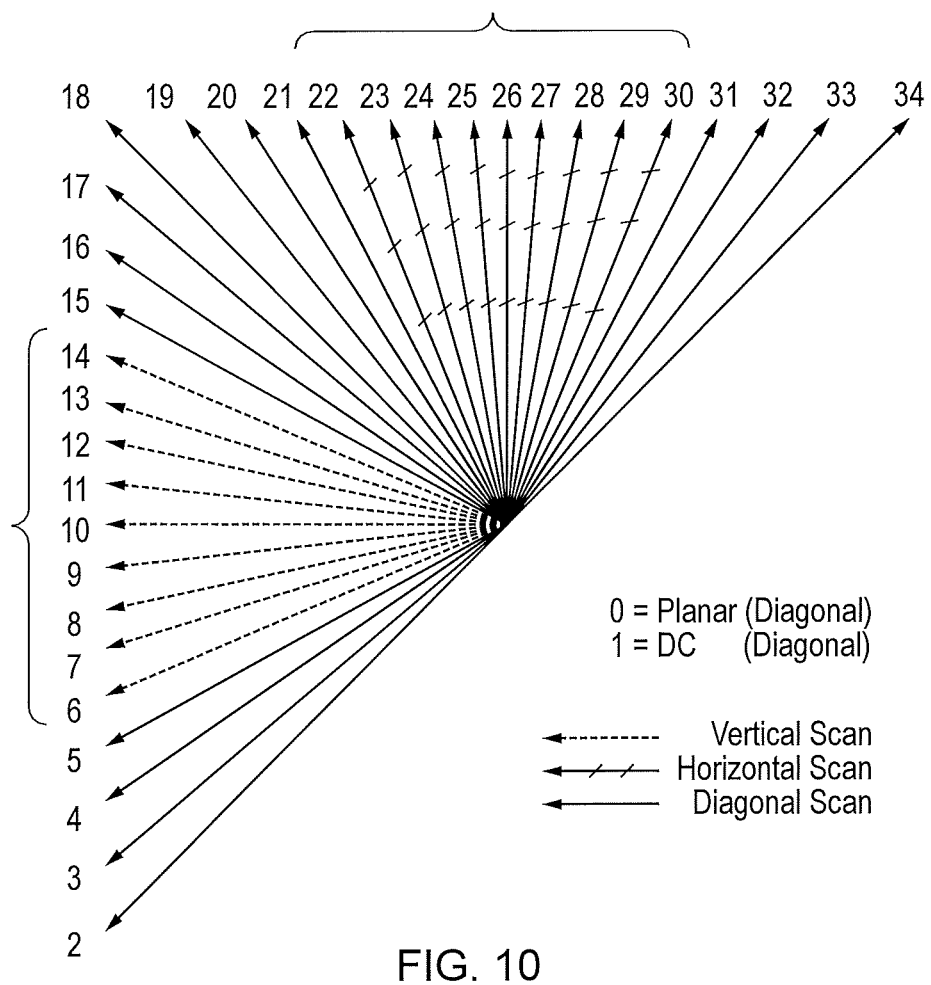
FIG. 10 schematically illustrates a previously proposed technique for selecting a scan pattern.

Referring to FIG. 10, the vertical scan pattern is used for modes 6 to 14, which are modes that are within a threshold angle (or mode number) of horizontal (predominantly horizontal). The horizontal scan pattern is used for modes 22 to 30, which are modes that are within a threshold angle (or mode number) of vertical (predominantly vertical). The up-right diagonal scan, referred to in FIG. 36 as just the "diagonal" scan, is used for other modes. The threshold can be, for example, four mode numbers.

Note that the number of prediction modes illustrated in FIG. 10 is purely by way of example. Other sets of possible modes could be used. For example, 67 modes, 131 modes or another number of available modes could be considered. The mapping between modes and scan patterns may be different for 4:2:2 luminance and chrominance data. The mapping may be different for 4:2:2, 4:4:4, 4:2:0 and/or 4:0:0 video data. The set of candidate scan patterns can be different for use in respect of luminance and chrominance samples.

Example arrangements can provide a technique for selecting scan orders which is different to that shown in FIG. 10 and described above. Instead of the scan order being fixed (for example, always using the up-right diagonal scan) or being dependent only upon the prediction mode (so-called mode dependent coefficient scanning or MDCS) as shown in FIG. 10, an arrangement is provided which can adapt or learn the appropriate scan order during the coding process. In examples, a so-called context is used. In some respects this is similar to a CABAC context in that a variable or set of variables is modified at each occasion (or at least some occasions, for example omitting occasions on which a coded block departs from a reference criterion such as a predicted scan order by more than a threshold amount) on which a block is coded, and the current state of the set of variables is used to determine the scan order to be applied to a next or subsequent block.

To recap on the aims of the scanning order, one purpose is to attempt to encode coefficients or sample values in an order of decreasing or increasing magnitude. So, an aim can be to apply a scanning order which selects the highest (or lowest) magnitude coefficient first, followed by other coefficients which are non-zero, in the order of their magnitude (from higher (lower) magnitude to lower (higher) magnitude).

Although it might in principle appear possible to examine a block of coefficients during the coding process, detect the required scanning order from the decreasing order of magnitude of the coefficients and then use that particular scanning order, this would require a very large amount of data to be sent accompanying the encoded block in order to indicate the scanning order that was used. So, it is not considered a practical solution in this form. Instead, in the present examples, the scanning order is predicted from the nature of previously encoded blocks. The predicted scanning order is applied to the current block to be encoded and, in response to that encoding the data on which the prediction is based (the context) can be updated for use with a next block, and so on. In this way, the prediction is carried out such that it can be replicated at the decoder using data which is available to the decoder at the relevant time.

In example arrangements, the scan context is a data set which can maintain a state from which a scan order can be predicted, based upon properties of previously encoded blocks. In some examples, the scan context may be an array of data values. When a block of data is being encoded, a scan context appropriate to that block is queried to derive a predicted scan pattern. The choice of which scan context should be queried may be determined by side information (parameter information) such as intra-prediction mode, block size, or the like, or potentially by explicit information coded with the data stream (for example in one or more parameter sets). The following two stages then occur in an encoding system, in either order: the scan context is updated based on the actual data values in that block, and the block is scanned using the predicted scan order (before updating).

In the example embodiments, explicit information can be used to steer the scan order that is derived from the scan context without affecting the process that updates the scan context. Examples of this can be used to implement a signalled most-probable-scan system, where the most probable scan is learnt by the scan context and the signalling of whether the most probable scan is to be used or some scan selected from a set of default scans. In other examples, combinations of explicit information that also indicates the usage of particular scan contexts can be used to implement a system that has multiple most-probable-scans.

Figure 11:
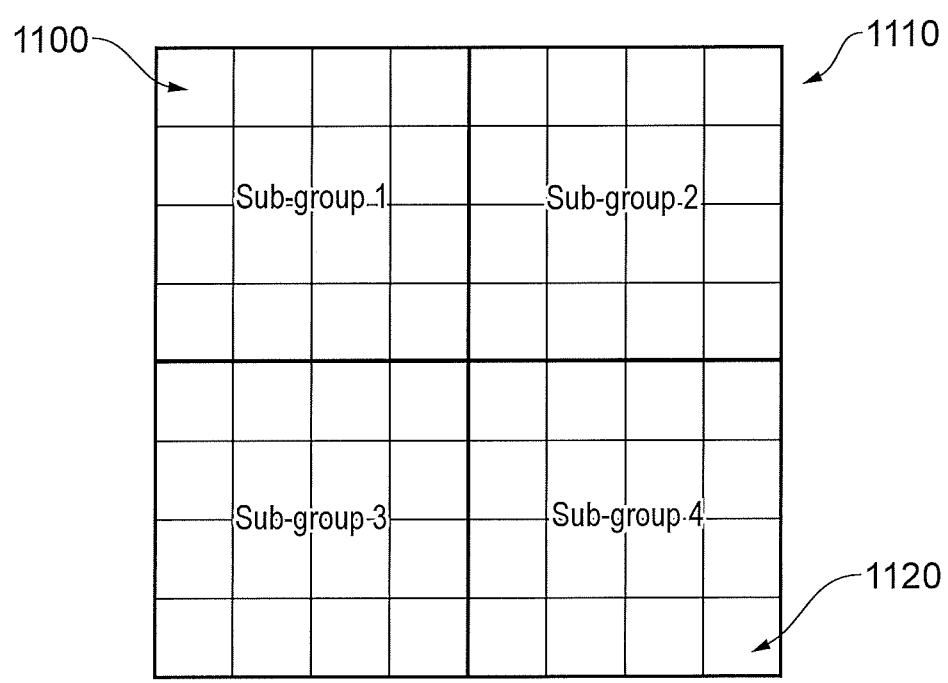
FIG. 11 schematically illustrates a block of samples.

In connection with the discussion which follows, some terminology will be introduced with reference to FIG. 11.

In embodiments of the disclosure, data values are encoded in blocks of values. The example of FIG. 11 shows the use of square blocks but this is not necessarily a requirement and other shapes of blocks such as rectangular blocks can be used.

FIG. 11 shows an example of a transform block or TB of coefficients. This example is an 8×8 block 1110 but, as mentioned above, other sizes and/or shapes of blocks may be used. Note, as discussed above, that in a transform skip mode, the coefficients may not in fact have been subject to a frequency transformation but the same term TB is still used. So, a TB relates to a block at that stage in the apparatus, whether or not an actual transform has been performed or skipped.

Within the blocks 1110, sets of sixteen coefficients in a 4×4 array are defined as sub-groups. There are four sub-groups shown in FIG. 11, numbered from sub-group 1 to sub-group 4. Note that this is just an example, and that sub-blocks are not required to be used. Various arrangements have been proposed which do not use sub-blocks such as development versions of HEVC and MPEG4-SStP. Other arrangements can use non-square sub-blocks and/or non-square TBs.

Within the TB, transform coefficients are arranged in frequency order such that a lowest frequency (for example, DC) coefficient is schematically represented at the top left of the block (a coefficient 1100) and a highest frequency coefficient 1120 is schematically represented at the bottom right of the block.

Figure 12:
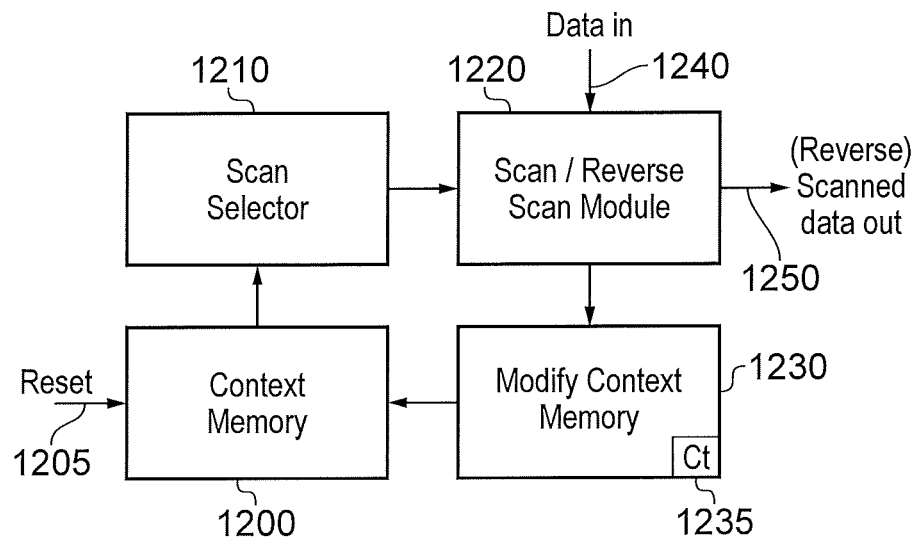
FIG. 12 schematically illustrates a scan pattern generator.

FIG. 12 schematically illustrates a scan pattern generator comprising a context memory 1200, a scan selector 1210, a scan/reverse scan module 1220 and modification logic 1230. Note that the apparatus of FIG. 12 applies to an encoder (at least to the scan operation in the forward path) and to a decoder (to the reverse scan operation).

The context memory 1200 stores one or more scan contexts. A context is used to maintain a state that allows the derivation of a likely or even most likely scan pattern. Examples of contexts to be discussed below are represented as multi element structures such as arrays. Multiple contexts may be stored, and these techniques will be discussed below. For now, in a simplified initial example, the context memory can be considered as holding a single context for this initial overview discussion.

The context data store provides an example of an attribute data store to store attribute data. The context data provides an example of attribute data.

The scan selector 1210 examines the current contents of the context memory 1200 and, in response to those contents, selects a scan pattern for use in connection with the current TB. Therefore, in these examples, the scan selector provides an example of a processing order selector to select a processing order for processing a current array of data values in dependence on one or more attributes of a plurality of arrays of data values in the video signal already processed.

The scan/reverse scan module of FIG. 5 (as an example of a data processor to process a video data signal comprising successive arrays of data values according to respective data value processing orders associated with the arrays of data values) applies the scan pattern (in the case of encoding) or a reverse scan pattern (in the case of the return path of an encoder or in the case of decoding) to input data 1240 to generate (reverse) scanned data output 1250.

The input data (in the case of the forward path of the encoder) or the output data (in the case of a decoder) is provided to the modification logic 1230 which modifies the data held by the context memory in response to attributes of the input or output data as the case may be. These operations will be discussed further below. The modification logic may include memory 1235 storing a count value, which again will be discussed below.

Therefore, in these examples, the processing order selector (such as the scan selector 1210) is configured to select a processing order for processing a current array of data values in dependence upon the stored attribute data; and the apparatus comprises a modification module (1230) configured to generate updated attribute data, for storage by the attribute data store (1200), in response to previously stored attribute data and the current array of data values, the updated attribute data being for use in selecting a processing order in respect of a subsequently processed array of sample values.

Figure 13:
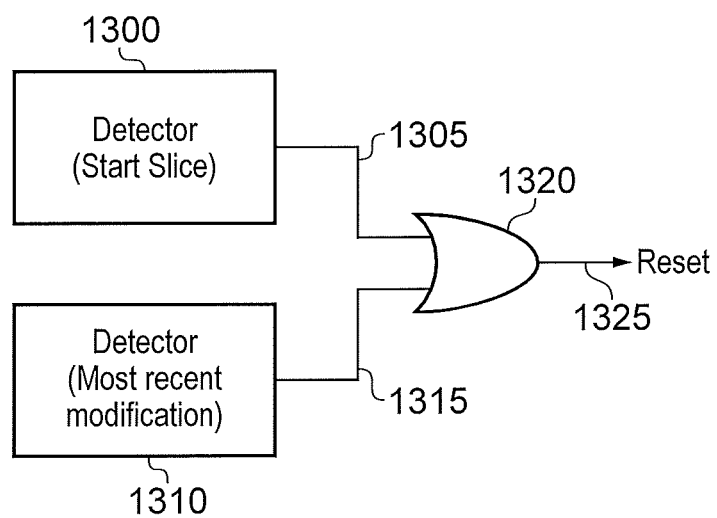
FIG. 13 schematically illustrates reset apparatus.
Figure 14:
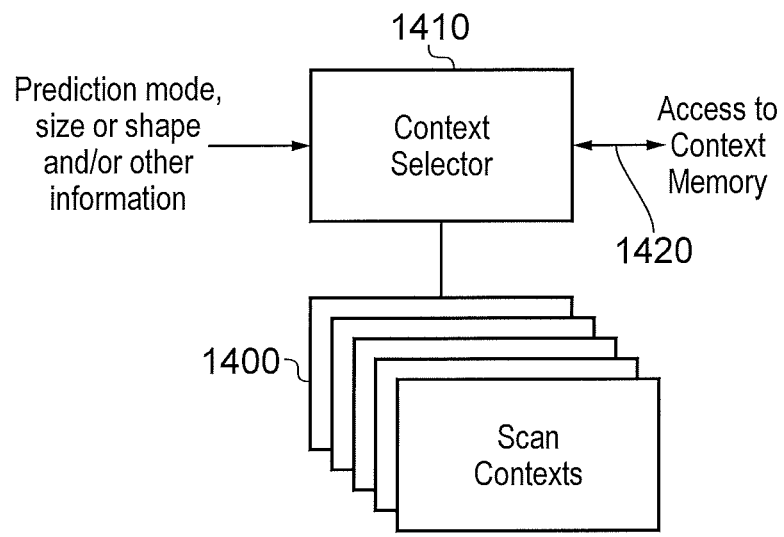
FIG. 14 schematically illustrates the use of multiple scan contexts.

The context memory 1200 is responsive to a reset signal 1205 to reset the context data held by the context memory 1200 to a predetermined initial state. FIG. 13 schematically illustrates reset apparatus to achieve this, comprising a detector 1300 which detects the start of a newly encoded or decoded slice or other portion of a picture and, in response to such a detection, generates an output signal 1305, and a detector 1310 which detects a quantity of data which has been encoded or decoded since the most recent modification to the context memory contents. If at least a threshold amount of data has been encoded or decoded since the context memory was last updated, the detector 1310 generates a signal 1315. A combiner (such as an OR-gate 1320) combines the signals 1305, 1315 such that if either of them is triggered, a reset signal 1325 is provided to the context memory as the signal 1205.

Optional variations regarding the detector 1310 will be discussed below.

The scan contexts are initialised to a predetermined initialise state. Initialising is applied at the start of every slice, which, as mentioned above, allows slices to be decoded independently. However, there is the possibility to select different initial states with implicit/explicit information.

Example initialisation values (for example, for 4×4 blocks) can be the average of the scan contexts after each frame of a multiple frame test video sequence. However, such a learning process itself requires initialisation values, which can be a flat value (the relevance of the values will be discussed below).

Other examples of initialisation values can be to populate the scan contexts at reset with data which will be interpreted by the scan selector as a default scan order such as for 8×8 blocks, vertical for the horizontal intra modes (and using the symmetry described previously, horizontal scan for vertical intra modes) and diagonal otherwise.

Resetting the context at the start of a slice allows that slice to be decoded independently of other slices. Optionally resetting the context if it has not been modified for a threshold number of operations means that a block which is spatially separated from one or more blocks last used to modify the context will not be scanned according to a (potentially rather different) context. Instead the predetermined initial values are used.

FIG. 13 provides an example of a reset module configured to reset the attribute data to initialisation values in response to one or both of: (i) the start of processing of an independently processable image region (such as a slice) of the video data signal; and (ii) a detection that at least a threshold number of arrays of data values have been processed without modification to the attribute data. In some examples, the initialisation values are such that the processing order selector interprets the initialisation values as indicating a predetermined processing order. As mentioned above, multiple contexts can be provided. In the present examples, different contexts are provided for different sub-groups of prediction modes. Also, different contexts are provided for different TB sizes and/or shapes. As a modification of the example apparatus of FIG. 12, the context memory 1200 is implemented as multiple stored contexts 1400 accessed via a context selector 1410 responsive to the prediction mode, block size/shape and/or other information to provide access 1420 to the appropriate one of the contexts stored in the context memory.

Figure 15:
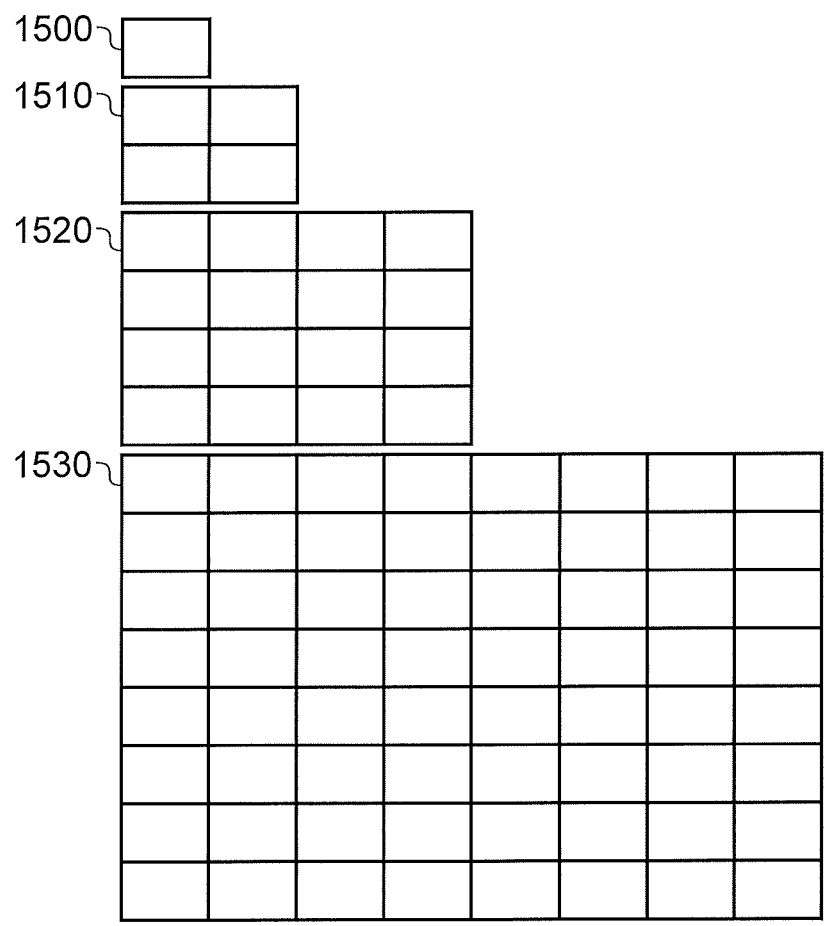
FIGS. 15 and 16 are schematic representations of scan context data.

The stored contexts may provide, for example, one set of data which can be used to define the way in which the sub-groups are scanned, which is to say which sub-group is scanned first, followed by which sub-group is scanned next and so on. FIG. 15 is a schematic representation of this type of context data comprising, for 4×4 blocks, one data item 1500 (which is not strictly necessary as there is only one way to choose a first sub-group to be scanned when there is only one sub-group present); for 8×8 blocks, there are 4 data items 1510; for 16×16 blocks, there are 16 data items 1520 and for 32×32 blocks, there are 64 data items 1530. This makes a total of 84 data items in this type of context data, for each instance of the context.

Further context data defines the scan order within a sub-group. The nature of the individual data items will be described below, but in the case of a 4×4 block, 16 data items 1600 are provided, and for each higher size block, 64 data items 1610, 1620, 1630 are provided. Here, in the case of 16×16 and 32×32 TBs, context data is used only in respect of the top left (lower frequency) 8×8 coefficients. This is because, in general terms, for TBs larger than 8×8, there is generally very little information outside of the top-left 8×8 region of coefficients. That is to say, when 32×32 blocks are in use, it is rare to get high frequency coefficients. When such cases occur, the encoder generally elects (by trial encoding or other techniques) to encode the region as multiple smaller-sized blocks. Therefore the ability to adapt the scan order for high frequency components is both less predictable and less important. This is a reason why only the top-left 8×8 coefficients of large TBs are currently considered in the example embodiments. This feature also reduces storage requirements. In some examples, the scan orders for the high-frequency coefficients are currently pre-defined. In other examples, they are extrapolated from other information in the scan-context. In other examples, scan contexts are maintained for each block size and shape, and for the whole of each such block. This provides an example in which for at least a subset of the group of array sizes, the attribute data relates to selection of a processing order for a portion of the array of data values, and an example in which the arrays of data values comprise frequency-separated coefficients dependent upon video data samples; and the portion of an array of data values represents a portion representing lower spatial frequencies.

Figure 16:
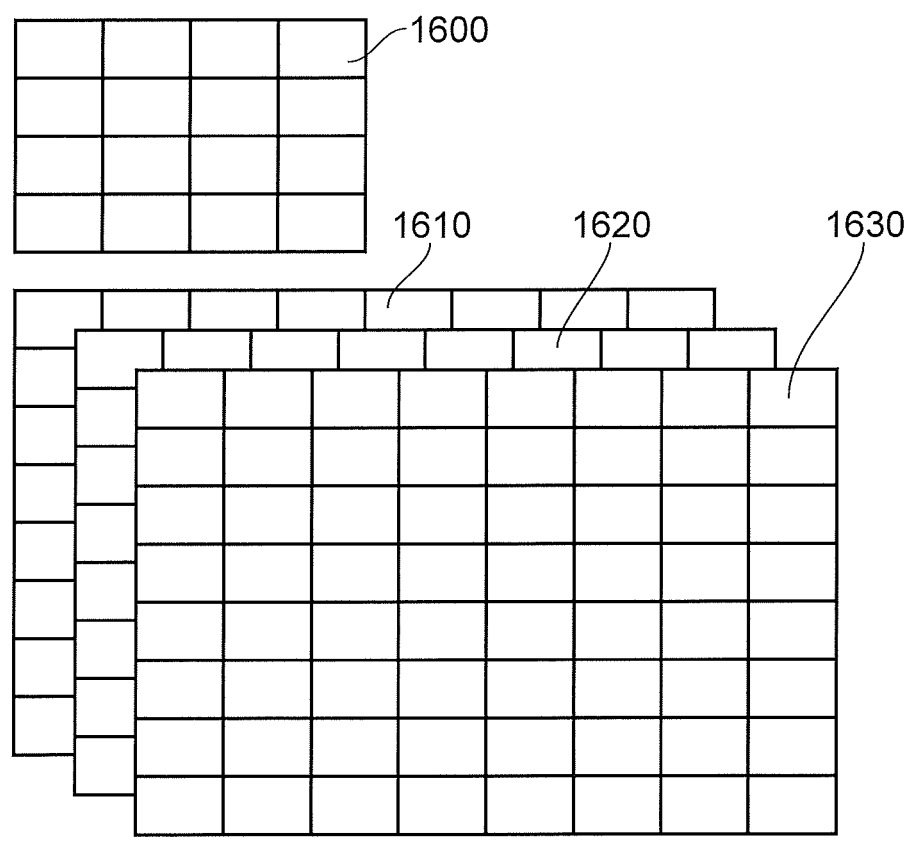

So, returning to the example case of FIG. 16, there are 208 elements in each instance of the context.

FIGS. 15 and 16 therefore provide examples in which the arrays of data values have an array size selected from a group of two or more possible array sizes; the attribute data store is configured to store attribute data associated with each of two or more possible array sizes; and the processing order selector is configured to select a processing order in dependence attribute data associated with the array size of the current array of data values.

As mentioned above, multiple instances of the context data can be provided for subsets of the prediction modes. FIG. 17 is a schematic mapping table which maps the prediction modes shown in FIG. 10 against sets of context data referred to by a set number or "Set Nb" in FIG. 17. This is an example in which the attribute data comprises two or more sets of attribute data; and the processing order selector is configured to select a processing order in dependence upon one of the sets of attribute data, the set being selected in response to one or more predetermined parameters associated with the current array of data values. the mapping by prediction mode provides an example in which the arrays of data values are dependent upon a predicted version of a set of video data samples having an associated prediction mode selected from a group of two or more possible prediction modes; and one of the one or more predetermined parameters is dependent upon the prediction mode for the current array of data values.

The number of the sets of context data used in the mapping of FIG. 17 implies that there are fewer sets of context data than there are prediction modes (the prediction mode being an example of side information). Having a scan context for every combination of side information (and any explicit signalling) would be possible but could potentially imply that the learning or adaptation process is less efficient. This is because each scan context is modified, and therefore adapts, only when that scan context is used. Having a large number of scan contexts could impact processing speed and could mean that some of them are used (and modified) relatively rarely, because of the rarity of use of some particular prediction modes, which in turn could mean that the adaptation is less appropriate to a current block than if fewer (but more likely to be adapted) scan contexts were used. On the other hand, just having a very small number of scan contexts could limit the system's ability to respond to different coding scenarios. In the present examples, a number of scan contexts is used which is greater than one but fewer than the number of permutations of the side information (in this example, 35) used to select a scan context, and based upon the side information (and any explicit signalling), a mapping is applied. It will be seen that multiple combinations of the side information can lead to the same scan-context being used.

This arrangement therefore provides an example in which there are fewer sets of attribute data than the number of possible prediction modes, so that multiple prediction modes are associated with respective sets of attribute data.

Once again, note that the use of thirty five prediction modes is merely an example, and other numbers of prediction modes may be used, in which case the mappings could follow a similar pattern but would be of course different.

Note also that a separate scan context (or contexts) can be used in the case that the transform skip mode is used.

In FIG. 17, eleven sets of context data are provided and are distributed amongst the prediction modes as shown by the table. Note that the symmetry of the angular distribution shown in FIG. 10 means that the modes 19 . . . 34 can in fact use the same sets as corresponding modes 18 . . . 2, and that a symmetry can be provided around mode 10 and mode 26. However, in general, a mapping is provided between prediction mode or direction and a set of context data. The mapping can provide symmetry around some mode (angle) numbers, for example in correspondence with the actual angular symmetry of the modes around the horizontal or vertical. This can reduce the amount of data to be handled or stored in the present processes.

In the examples discussed here, scan-contexts are used which are size dependent, since the nature of the residual data being coded appears to be size dependent. That is to say, data specific to different block sizes are provided. The TB size does not need to be explicitly labelled in FIG. 17, because each scan context as described includes data applicable to each possible block size and shape in these examples.

In some examples, luma and chroma data are currently processed differently. For example, the adaptive scanning process might not be applied to chroma, and therefore chroma data can be scanned using (for example) MDCS or a fixed scanning pattern. However, in other examples, a similar adaptive process to that used for the luma data may be applied. This could use the same or separate scan contexts.

In doing this, the two chroma channels could be treated separately (as Cb and Cr), or combined (simply as chroma). In the case of GBR signals. the G channel may be treated as Y, and the BR data treated as Cb and Cr. Note also that additional optional alpha plane coding may or may not be related to one of the channels/groupings.

In FIG. 17, the prediction mode is used as example side data, to select a scan context. In other embodiments, however, different and/or additional side data may be used in various permutations to select the scan context. For example, for inter-image predicted blocks, one or more of the motion magnitude direction, sub-pixel offset, merge mode, picture index, prediction type (bidirectional or unidirectional) and/or prediction data block structure, transform skip mode and/or position in the picture may be used as side data. Further encoding features may be used as additional or substitute side data, such as EMT (explicit multi-transform) mode, intra prediction filtering schemes, NSST (non-separable secondary transform).

The way in which the contexts are populated, and the way in which the context data may be used to derive a scan pattern, will now be described.

At reset or initialisation, the scan contexts are initially populated. For example, the initial population can be with a flat value, with values derived from encoding test data, with values that will be interpreted by the scan selector to indicate a default scan order, or the like.

The scan context is updated after the coding of each TB (note that at encoding, the updating does not have to wait until after the block has been scanned and can execute concurrently or even in advance of encoding; but the scan pattern used for that block has to be such that it would be available at the decoder side before decoding of the block).

In some examples, the scan context is not updated if the block of data meets a criterion for sparseness, for example if there is only one non-zero coefficient in the block being encoded or decoded. One or more other criteria can be applied (as well or instead) which, if met, signify that the scan context is not updated. Examples of such criteria include that the predicted scan order is too far from the scan order derived by these techniques; or that the block was not transformed (in a transform skip mode for example).

An example of the update process is as follows:

Each value in the two arrays (one referring to an inter-sub-group scanning order, the other relating to an intra-sub-group scanning order) represents a scaled accumulated ranked order.

For each position relevant to the current TB size in the two arrays:

Let currentVal be the value in the array being updated.
For the per-coefficient arrays (representing an intra-sub-group scanning order), let inputRank be the coefficient ranked by magnitude within the respective sub-group. Let inputRank be the position of the corresponding data value (coefficient) in a ranked order of coefficients (for example, a highest magnitude coefficient in a 4×4 array has inputRank=0 and a lowest magnitude coefficient has inputRank=15)
For the inter-sub-group arrays, the inputRank is formed by averaging (or summing) the coefficients within each sub-group and ranking those values.
Update currentVal so that it maintains a fraction of the previously accumulated ranked order and a fraction of the rank of the input coefficient.
That is to say, currentVal:=(currentVal*scale)+inputRank.

In some examples, the update equation is further constrained to:

currentVal+=inputRange−(currentVal>>log 2learningRate)

Here, the symbol >>(n) indicates a right shift by n bits. Empirical studies have indicated an appropriate example value of log 2learningRate=7.

In these examples, the attribute data comprises an array of attribute values each dependent upon corresponding data values at respective array positions in the array of data values, and the modification module is configured so that the updated attribute data is partially dependent upon the previously stored attribute data and partially dependent upon a ranking, in magnitude order, of the current array of data values.

Figure 18:
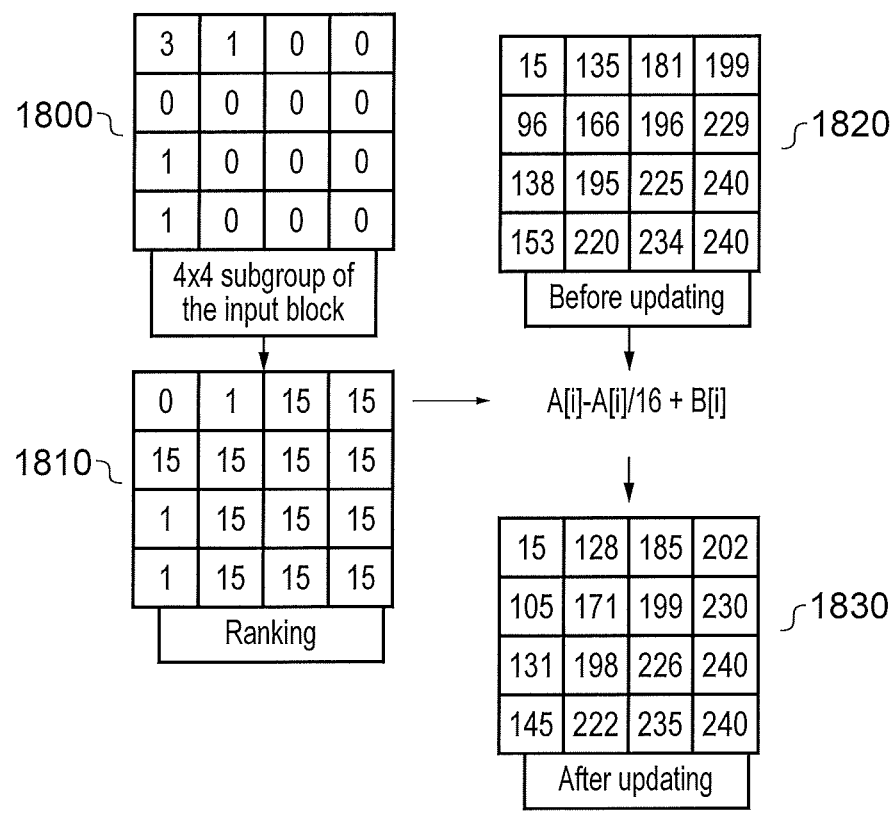
FIG. 18 schematically illustrates an updating process.

FIG. 18 schematically illustrates the update mechanism discussed above (as it relates to the intra-sub-group scanning order).

An example 4×4 sub-group 1800 of an input TB is shown, leading to an array 1810 of ranking values inputRank.

The previous stage of the relevant part of the relevant scan context is indicated by an array 1820. This is the state before updating takes place, and is the state on which the scan selector operates to select a scan pattern for use in respect of the subgroup 1800.

The update equation is applied to the array 1820, in which A[i] represents an array value of the array 1820, B[i] represents an array value of the array 1810, and scale=16 in this example. This generates an updated scan context 1830 for use in the next appropriate instance.

It has been noted in empirical tests that as the process goes further in the scan order, more and more array positions are ranked as position or inputRank=15; this means no value or the lowest in magnitude is found in these positions.

A possible method to resolve this issue or ranking is to consult the array values for those positions. If the array values are different, rank the values according to the array values. If the array values have the same value, then give both values the same inputRank, and/or apply those values in a diagonal order. Alternatively, a horizontal or vertical order can be used, depending on the prediction mode.

Other options include applying a dampening (such as a low pass filtering operation) to changes in inputRank to avoid instability. For example, such a dampening arrangement could inhibit any changes of rank if the new order is radically different to the previous, or just reduce the effect of such changes. This is an example of the modification module comprising a filter to inhibit changes in the ranking of the attribute data values of more than a predetermined amount.

The way in which the scan contexts are used to derive scanning orders will now be described.

Figure 19:
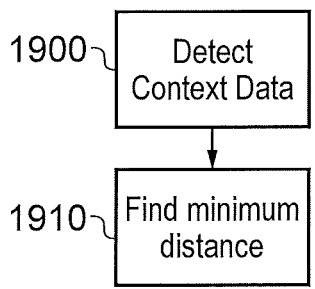
FIGS. 19 and 20 schematically illustrate scan pattern selection processes.

FIG. 19 is a schematic flowchart illustrating a method of selecting a scan order between sub-groups, which is to say an order by which a first sub-group is selected, followed by a second sub-group and so on.

At a step 1900, the context data applicable to the current number of sub-groups is selected, and at a step 1910, the minimum distance between the ordering of the context data and each of a set of predetermined scan orders (such as horizontal, vertical, diagonal, hybrid horizontal and hybrid vertical) is detected, such that the predetermined scan order having the lowest distance from the detected context data is used.

In this example, the distance is described as the sum of the distance between each individual value of the accumulator and the predefined scans.

The distance between an element of the reference scan (reference in the formula) and an element of the accumulator (array in the formula) is:

distance[$i$]=1000*abs((array[$i$]−reference[$i$]/reference[$i$]))

The distance values are summed across the array [$i$]. A normalising process can first be used (before the above formula is applied) so that the arrays have the same minimal values and the same maximal values.

FIG. 10 schematically illustrates the selection of a scan order within a sub-group.

At a step 2000, the appropriate set of context data is detected.

At a step 2010, a detection is made as to whether a threshold amount of learning has taken place, which is to say, the context data has been modified at least a threshold number of times (as indicated by the count value stored by the modification logic 1230). If the threshold has not been reached, then a default scan order is used, such as a mode-dependent default scan order. This is an example in which the processing order selector is configured to select either: (i) a processing order dependent upon the attribute data, when the attribute data has been modified by the modification processor at least a predetermined number of times; or (ii) otherwise, a predetermined processing order.

If, however, the threshold has been reached, then control passes to a step 2030 at which the context data values are ranked in order and this order is used to define the appropriate scan order at a step 2040.

At the step 2040, the scan order is determined by the scan context array values ranked in order of magnitude from the greatest magnitude to the lowest (as discussed, the ordering could be in the opposite sense)

Figure 20:
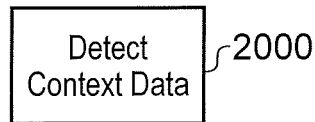
Figure 20:
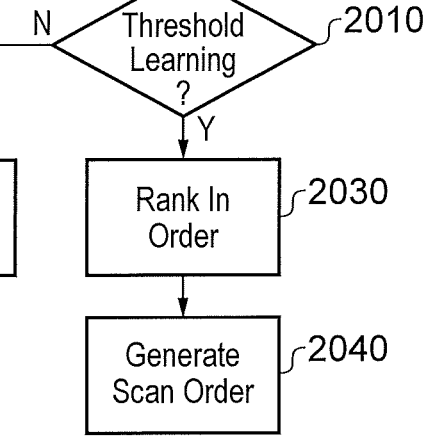

FIGS. 19 and 20 provide respective examples in which the processing order selector is configured to select one or both of: (i) a sub-array processing order (FIG. 19) defining an order of processing of two or more sub-arrays of the current array of data values, each sub-array comprising two or more data values; and (ii) a data value processing order (FIG. 20) defining an order or processing of data values within a sub-array.

If two array positions have the same value, a rule can be applied to rank them in order. For example, the value with the lower raster scan position (that is to say, the nearest to the top left in a horizontal raster order from top left to bottom right) is placed the lower ranked position. This is an example in which, when two or more of the current array of data values have an equal ranking in magnitude order, the modification module is configured to assign those data values a ranking dependent upon the relative ranking of corresponding attribute values of the previously stored attribute data.

Some encoding/decoding systems can impose constraints that positions above and to the left have a lower scan order, which is to say (for example) that the constraints are the positions above and to the left must have already been sufficiently processed in order to process the current position. This constraint might be reversed for a entropy coder preferring increasing magnitudes. These constraints can be coded into the ranking system.

Further optional features include any one or more of:

(i) Do not update the scan context in some cases: for example, inhibit the operation of the modification logic (so as not to apply an update) when inputRank for a current block is more than a threshold distance (see the discussion of distance above) from the predicted scan pattern. This provides an example in which the modification module is configured to perform either: (a) no modification of the stored attribute data, when the selected processing order differs by no more than a predetermined difference from a ranking of the data values of the current array in order of magnitude; or (b) otherwise, a modification of the stored attribute data.

(ii) Apply different values of learningRate and/or Scale for different sets and/or array sizes and/or array shapes and/or sub-groups and/or array positions within subgroups;

(iii) Reset more often than just at the start of a slice, for example when a set has not been used or updated for a threshold number of blocks (as discussed above in connection with the detector 1310) and/or when a threshold number of blocks (for that set, or across the sets) are too far in ranked order from the predicted scan;

(iv) Do not apply sub-group ranking (in a system where transform blocks are further split into sub-groups) (instead deriving it from the 4×4 ranking); This provides an example of the processing order selector being configured to derive the sub-array processing order from the data value processing order for a current array of data values;

(v) Replace the ranking operation by an approximation (such as a so-called hash function). For example, use a function of the magnitude such as:

| Input magnitude, i | Hashed rank |
|---|---|
| 0 | 0 |
| 1 | 1 |
| 2-3 | 2 |
| 4-7 | 3 |
| 8-15 | 4 ... |
| for all i > 0 | roundDown{ log2(i) }+1 |

These values can be ordered appropriately according to the techniques discussed above (depending on whether the order is from the largest coefficient first or the smallest coefficient first). In other words, the polarity of the hashed ranks (whether a large hashed rank value represents a large or a small coefficient) does not of itself determine the ordering used.

Another option is to use a hashed rank value (such as 0) for non-zero coefficients and another hashed rank value (such as 15) for zero coefficients.

(vi) For bigger blocks (above 4×4, for example), derive only an inter-sub-group scanning order, and use other previously proposed techniques (fixed scan, MDCS or the like) within the sub-groups.

(vii) Vary the number of sets.

Figure 21:
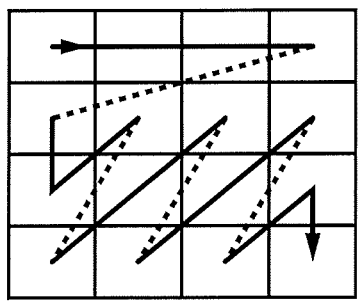
FIGS. 21 and 22 schematically illustrate so-called hybrid scan patterns.
Figure 22:
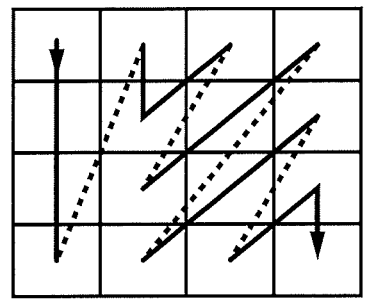

FIGS. 21 and 22 schematically illustrate (respectively) a hybrid horizontal scan pattern and a hybrid vertical scan pattern.

Figure 23:
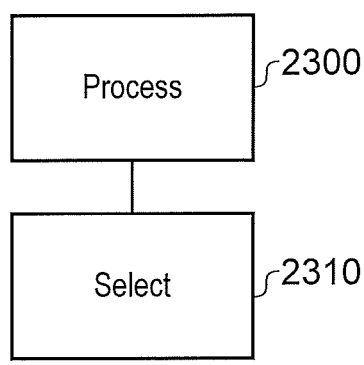
FIGS. 23 and 24 are schematic flowcharts illustrating methods.

FIG. 23 is a schematic flowchart illustrating an image data encoding method comprising:

processing (at a step 2300) an image data signal comprising successive arrays of data values according to respective data value processing orders associated with the arrays of data values; and selecting (at a step 2310) a processing order for processing a current array of data values in dependence on one or more attributes of a plurality of arrays of data values in the image data signal already processed by the data processor.

Figure 24:
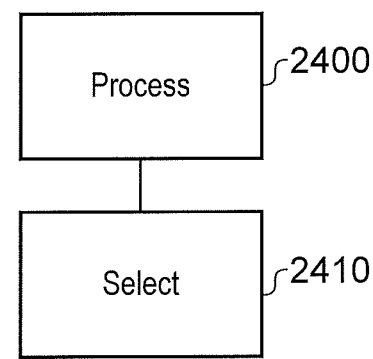

FIG. 24 is a schematic flowchart illustrating an image data decoding method comprising:

processing (at a step 2400) an image data signal comprising successive arrays of data values according to respective data value processing orders associated with the arrays of data values; and selecting (at a step 2410) a processing order for processing a current array of data values in dependence on one or more attributes of a plurality of arrays of data values in the image data signal already processed by the data processor.

Data Signals

It will be appreciated that data signals generated by the variants of coding apparatus discussed above, and storage or transmission media carrying such signals, are considered to represent embodiments of the present disclosure.

Where methods of processing, coding or decoding are discussed above, it will be appreciated that apparatus configured to perform such methods are also considered to represent embodiments of the disclosure. It will also be appreciated that video storage, transmission, capture and/or display apparatus incorporating such techniques is considered to represent an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Respective embodiments are defined by the following numbered clauses:

1. Image data encoding apparatus comprising:
   a data processor configured to process an image data signal comprising successive arrays of data values according to respective data value processing orders associated with the arrays of data values; and
   a processing order selector configured to select a processing order for processing a current array of data values in dependence on one or more attributes of a plurality of arrays of data values in the image data signal already processed by the data processor.

2. Apparatus according to clause 1, comprising:
   an attribute data store to store attribute data;
   in which:
   the processing order selector is configured to select a processing order for processing a current array of data values in dependence upon the stored attribute data; and
   the apparatus comprises a modification module configured to generate updated attribute data, for storage by the attribute data store, in response to previously stored attribute data and the current array of data values, the updated attribute data being for use in selecting a processing order in respect of a subsequently processed array of sample values.

3. Apparatus according to clause 2, in which the attribute data comprises an array of attribute values each dependent upon corresponding data values at respective array positions in the array of data values.

4. Apparatus according to clause 2 or clause 3, in which:
   the modification module is configured so that the updated attribute data is partially dependent upon the previously stored attribute data and partially dependent upon a ranking, in magnitude order, of the current array of data values.

5. Apparatus according to clause 4 in which, when two or more of the current array of data values have an equal ranking in magnitude order, the modification module is configured to assign those data values a ranking dependent upon the relative ranking of corresponding attribute values of the previously stored attribute data.

6. Apparatus according to any one of clauses 2 to 5, in which the modification module comprises a filter to inhibit changes in the ranking of the attribute data values of more than a predetermined amount.

7. Apparatus according to any one of clauses 2 to 6, in which the processing order selector is configured to select either:
   (i) a processing order dependent upon the attribute data, when the attribute data has been modified by the modification processor at least a predetermined number of times; or
   (ii) otherwise, a predetermined processing order.

8. Apparatus according to any one of the preceding clauses, in which the modification module is configured to perform either:
   (i) no modification of the stored attribute data, when the selected processing order differs by no more than a predetermined difference from a ranking of the data values of the current array in order of magnitude; or
   (ii) otherwise, a modification of the stored attribute data.

9. Apparatus according to any one of the preceding clauses, in which:
   the attribute data comprises two or more sets of attribute data; and
   the processing order selector is configured to select a processing order in dependence upon one of the sets of attribute data, the set being selected in response to one or more predetermined parameters associated with the current array of data values.

10. Apparatus according to any one of the preceding clauses, in which:
    the arrays of data values are dependent upon a predicted version of a set of image data samples having an associated prediction mode selected from a group of two or more possible prediction modes; and
    one of the one or more predetermined parameters is dependent upon the prediction mode for the current array of data values.

11. Apparatus according to clause 10, in which there are fewer sets of attribute data than the number of possible prediction modes, so that multiple prediction modes are associated with respective sets of attribute data.

12. Apparatus according to any one of the preceding clauses, in which:
    the arrays of data values have an array size selected from a group of two or more possible array sizes;
    the attribute data store is configured to store attribute data associated with each of two or more possible array sizes; and
    the processing order selector is configured to select a processing order in dependence attribute data associated with the array size of the current array of data values.

13. Apparatus according to clause 12, in which for at least a subset of the group of array sizes, the attribute data relates to selection of a processing order for a portion of the array of data values.

14. Apparatus according to clause 13, in which:
    the arrays of data values comprise frequency-separated coefficients dependent upon image data samples; and
    the portion of an array of data values represents a portion representing lower spatial frequencies.

15. Apparatus according to any one of the preceding clauses, comprising:
    a reset module configured to reset the attribute data to initialisation values in response to one or both of:
    (i) the start of processing of an independently processable image region of the image data signal; and
    (ii) a detection that at least a threshold number of arrays of data values have been processed without modification to the attribute data.

16. Apparatus according to clause 15, in which the initialisation values are such that the processing order selector interprets the initialisation values as indicating a predetermined processing order.

17. Apparatus according to any one of the preceding clauses, in which the processing order selector is configured to select one or both of:
    (i) a sub-array processing order defining an order of processing of two or more sub-arrays of the current array of data values, each sub-array comprising two or more data values; and
    (ii) a data value processing order defining an order or processing of data values within a sub-array.

18. Apparatus according to clause 17, in which the processing order selector is configured to derive the sub-array processing order from the data value processing order for a current array of data values.

19. Apparatus according to any one of the preceding clauses, in which the image data comprises two or more colour channels, and the processing order selector is configured to act with respect to a subset of the colour channels.

20. Image storage, transmission, capture or display apparatus comprising apparatus according to any one of the preceding clauses.

21. Image data decoding apparatus comprising:
   a data processor configured to process an image data signal comprising successive arrays of data values according to respective data value processing orders associated with the arrays of data values; and
   a processing order selector configured to select a processing order for processing a current array of data values in dependence on one or more attributes of a plurality of arrays of data values in the image data signal already processed by the data processor.

22. Apparatus according to clause 21, comprising:
   an attribute data store to store attribute data;
   in which:
   the processing order selector is configured to select a processing order for processing a current array of data values in dependence upon the stored attribute data; and
   the apparatus comprises a modification module configured to generate updated attribute data, for storage by the attribute data store, in response to previously stored attribute data and the current array of data values, the updated attribute data being for use in selecting a processing order in respect of a subsequently processed array of sample values.

23. Apparatus according to clause 22, in which the attribute data comprises an array of attribute values each dependent upon corresponding data values at respective array positions in the array of data values.

24. Apparatus according to clause 22 or clause 23, in which:
   the modification module is configured so that the updated attribute data is partially dependent upon the previously stored attribute data and partially dependent upon a ranking, in magnitude order, of the current array of data values.

25. Apparatus according to clause 24 in which, when two or more of the current array of data values have an equal ranking in magnitude order, the modification module is configured to assign those data values a ranking dependent upon the relative ranking of corresponding attribute values of the previously stored attribute data.

26. Apparatus according to any one of clauses 22 to 25, in which the modification module comprises a filter to inhibit changes in the ranking of the attribute data values of more than a predetermined amount.

27. Apparatus according to any one of clauses 22 to 26, in which the processing order selector is configured to select either:
   (i) a processing order dependent upon the attribute data, when the attribute data has been modified by the modification processor at least a predetermined number of times; or
   (ii) otherwise, a predetermined processing order.

28. Apparatus according to any one of clauses 21 to 27, in which the modification module is configured to perform either:
   (i) no modification of the stored attribute data, when the selected processing order differs by no more than a predetermined difference from a ranking of the data values of the current array in order of magnitude; or
   (ii) otherwise, a modification of the stored attribute data.

29. Apparatus according to any one of clauses 21 to 28, in which:
   the attribute data comprises two or more sets of attribute data; and
   the processing order selector is configured to select a processing order in dependence upon one of the sets of attribute data, the set being selected in response to one or more predetermined parameters associated with the current array of data values.

30. Apparatus according to any one of clauses 21 to 29, in which:
   the arrays of data values are dependent upon a predicted version of a set of image data samples having an associated prediction mode selected from a group of two or more possible prediction modes; and
   one of the one or more predetermined parameters is dependent upon the prediction mode for the current array of data values.

31. Apparatus according to clause 30, in which there are fewer sets of attribute data than the number of possible prediction modes, so that multiple prediction modes are associated with respective sets of attribute data.

32. Apparatus according to any one of clauses 21 to 31, in which:
   the arrays of data values have an array size selected from a group of two or more possible array sizes;
   the attribute data store is configured to store attribute data associated with each of two or more possible array sizes; and
   the processing order selector is configured to select a processing order in dependence attribute data associated with the array size of the current array of data values.

33. Apparatus according to clause 32, in which for at least a subset of the group of array sizes, the attribute data relates to selection of a processing order for a portion of the array of data values.

34. Apparatus according to clause 33, in which:
   the arrays of data values comprise frequency-separated coefficients dependent upon image data samples; and
   the portion of an array of data values represents a portion representing lower spatial frequencies.

35. Apparatus according to any one of clauses 21 to 34, comprising:
   a reset module configured to reset the attribute data to initialisation values in response to one or both of:
   (i) the start of processing of an independently processable image region of the image data signal; and
   (ii) a detection that at least a threshold number of arrays of data values have been processed without modification to the attribute data.

36. Apparatus according to clause 35, in which the initialisation values are such that the processing order selector interprets the initialisation values as indicating a predetermined processing order.

37. Apparatus according to any one of clauses 21 to 36, in which the processing order selector is configured to select one or both of:
   (i) a sub-array processing order defining an order of processing of two or more sub-arrays of the current array of data values, each sub-array comprising two or more data values; and
   (ii) a data value processing order defining an order or processing of data values within a sub-array.

38. Apparatus according to clause 37, in which the processing order selector is configured to derive the sub-array processing order from the data value processing order for a current array of data values.

39. Apparatus according to any one of clauses 21 to 38, in which the image data comprises two or more colour channels, and the processing order selector is configured to act with respect to a subset of the colour channels.

40. Image storage, transmission, capture or display apparatus comprising apparatus according to any one of clauses 21 to 39.

41. An image data encoding method comprising:
processing an image data signal comprising successive arrays of data values according to respective data value processing orders associated with the arrays of data values; and
selecting a processing order for processing a current array of data values in dependence on one or more attributes of a plurality of arrays of data values in the image data signal already processed by the data processor.

42. Computer software which, when executed by a computer, causes the computer to carry out a method according to clause 41.

43. A machine-readable non-transitory storage medium which stores software according to clause 42.

44. An image data decoding method comprising:
processing an image data signal comprising successive arrays of data values according to respective data value processing orders associated with the arrays of data values; and
selecting a processing order for processing a current array of data values in dependence on one or more attributes of a plurality of arrays of data values in the image data signal already processed by the data processor.

45. Computer software which, when executed by a computer, causes the computer to carry out a method according to clause 44.

46. A machine-readable non-transitory storage medium which stores software according to clause 45.

The invention claimed is:

1. An image data encoding apparatus, comprising:
circuitry configured to:
obtain arrays of data values, each of the arrays of data values corresponding to a respective block in an image;
reset attribute data stored in a data store to initialization values in response to one or both of:
(i) a start of processing of an independently processable image region of the image, and
(ii) a detection that at least a threshold number of arrays of data values have been processed without updating the attribute data;
determine a processing order for processing a current array of data values according to the attribute data that is stored in the data store before processing of the current array of data values, the attribute data including an array of attribute values respectively corresponding to the current array of data values;
process the current array of data values according to the determined processing order to obtain a processed array of data values;
encode the image to generate encoded image data according to the processed array of data values; and
update the attribute data stored in the data store according to the attribute data that is stored in the data store before the processing of the current array of data values and according to the current array of data values, the updated attribute data being for use in determining a processing order in respect of a subsequently processed array of data values.

2. The image data encoding apparatus according to claim 1, wherein the circuitry is further configured to update the attribute data according to rankings, in magnitude order, of the current array of data values.

3. The image data encoding apparatus according to claim 2, wherein the circuitry is configured to, when two or more data values of the current array of data values have an equal ranking in magnitude order, assign the rankings of the two or more data values of the data values according to the relative rankings of corresponding attribute values of the attribute data that is stored in the data store before the processing of the current array of data values.

4. The image data encoding apparatus according to claim 2, wherein the circuitry is further configured to inhibit changes in a ranking of the attribute data values of more than a predetermined amount.

5. The image data encoding apparatus according to claim 1,
wherein
the attribute data comprises a plurality of sets of attribute data, and
the circuitry is configured to determine the processing order according to one of the sets of attribute data that is selected according to one or more predetermined parameters associated with the current array of data values,
wherein
the arrays of data values are dependent upon a predicted version of a set of image data samples having an associated prediction mode selected from a group of two or more prediction modes,
one of the one or more predetermined parameters is dependent upon the prediction mode for the current array of data values, and
a number of sets of the sets of attribute data is less than a number of modes of the group of two or more prediction modes.

6. The image data encoding apparatus according to claim 1,
wherein
the arrays of data values have an array size selected from a plurality of array sizes,
the circuitry is further configured to:
store sets of attribute data associated with respective ones of the array sizes; and
determine the processing order according to one of the sets of attribute data associated with an array size of the current array of data values, wherein
for at least a subset of the plurality of array sizes, the respective set of attribute data relates to determination of a processing order for a portion of a particular array of data values,
the arrays of data values comprise frequency-separated coefficients dependent upon image data samples, and
the portion of the particular array of data values is a portion representing lower spatial frequencies.

7. An image data decoding apparatus, comprising:
circuitry configured to:
receive an encoded signal corresponding to arrays of data values, each of the arrays of data values corresponding to a respective block in an image;
reset attribute data stored in a data store to initialization values in response to one or both of:
(i) a start of processing of an independently processable image region of the image, and
(ii) a detection that at least a threshold number of arrays of data values have been processed without updating the attribute data;
determine a processing order for processing a current array of data values according to the attribute data that is stored in the data store before processing of the current array of data values, the attribute data including an array of attribute values respectively corresponding to the current array of data values;

process the current array of data values according to the determined processing order to obtain a processed array of data values;

decode the image to generate decoded image data according to the processed array of data values; and update the attribute data stored in the data store according to the attribute data that is stored in the data store before the processing of the current array of data values and according to the current array of data values, the updated attribute data being for use in determining a processing order in respect of a subsequently processed array of sample values.

8. The image data decoding apparatus according to claim 7, wherein the circuitry is configured to update the attribute data according to rankings, in magnitude order, of the current array of data values.

9. The image data decoding apparatus according to claim 8, wherein the circuitry is configured to, when two or more data values of the current array of data values have an equal ranking in magnitude order, assign the rankings of the two or more data values of the data values according to the relative rankings of corresponding attribute values of the attribute data that is stored in the data store before the processing of the current array of data values.

10. The image data decoding apparatus according to claim 7, wherein the circuitry is further configured to inhibit changes in a ranking of the attribute data values of more than a predetermined amount.

11. The image data decoding apparatus according to claim 7, wherein the circuitry is configured to
update the attribute data stored in the data store only when the determined processing order differs by more than a predetermined difference from rankings of the current array of data values in order of magnitude.

12. The image data decoding apparatus according to claim 7, wherein
the attribute data comprises a plurality of sets of attribute data, and
the circuitry is configured to determine the processing order according to one of the sets of attribute data that is selected according to one or more predetermined parameters associated with the current array of data values.

13. The image data decoding apparatus according to claim 7, wherein
the arrays of data values are dependent upon a predicted version of a set of image data samples having an associated prediction mode selected from a group of two or more prediction modes, and
one of the one or more predetermined parameters is dependent upon the prediction mode for the current array of data values.

14. The image data decoding apparatus according to claim 13, wherein a number of sets of the sets of attribute data is less than a number of a number of the group of two or more prediction modes.

15. The image data decoding apparatus according to claim 7, wherein
the arrays of data values have an array size selected from a plurality of array sizes, and
the circuitry is further configured to:
store sets of attribute data associated with respective ones of the array sizes; and
determine the processing order according to one of the sets of attribute data associated with an array size of the current array of data values.

16. The image data decoding apparatus according to claim 15, wherein, for at least a subset of the plurality of array sizes, the respective set of attribute data relates to determination of a processing order for a portion of a particular array of data values.

17. The image data decoding apparatus according to claim 16, wherein
the arrays of data values comprise frequency-separated coefficients dependent upon image data samples, and
the portion of the particular array of data values is a portion representing lower spatial frequencies.

18. The image data decoding apparatus according to claim 7, wherein the initialization values indicate a predetermined processing order.

19. The image data decoding apparatus according to claim 7, wherein the circuitry is configured to select one or both of:
(i) a sub-array processing order defining an order of processing of two or more sub-arrays of the current array of data values, each sub-array comprising two or more data values; and
(ii) a data value processing order defining an order or processing of data values within a sub-array.

20. The image data decoding apparatus according to claim 19, wherein the circuitry is configured to derive the sub-array processing order from the data value processing order for the current array of data values.

21. The image data decoding apparatus according to claim 7, wherein the encoded signal comprises two or more colour channels, and the circuitry is configured to act with respect to a subset of the colour channels.

22. An image storage, transmission, reception, capture or display apparatus comprising apparatus according to claim 19.

23. An image data encoding method comprising:
obtaining arrays of data values each of the arrays of data values corresponding to a respective block in an image;
resetting attribute data stored in a data store to initialization values in response to one or both of:
(i) a start of processing of an independently processable image region of the image, and
(ii) a detection that at least a threshold number of arrays of data values have been processed without updating the attribute data;
determining a processing order for processing a current array of data values according to the attribute data that is stored in the data store before processing of the current array of data values, the attribute data including an array of attribute values respectively corresponding to the current array of data values;
processing the current array of data values according to the determined processing order to obtain a processed array of data values;
encoding the image to generate encoded image data according to the processed array of data values; and
updating the attribute data stored in the data store according to the attribute data that is stored in the data store before the processing of the current array of data values and according to the current array of data values, the updated attribute data being for use in determining a processing order in respect of a subsequently processed array of data values.

24. A non-transitory computer readable medium including computer program instructions, which when executed by a computer causes the computer to perform the image data encoding method of claim 23.

25. An image data decoding method comprising:

receiving an encoded signal corresponding to arrays of data values, each of the arrays of data values corresponding to a respective block in an image;

resetting attribute data stored in a data store to initialization values in response to one or both of:

(i) a start of processing of an independently processable image region of the image, and (ii) a detection that at least a threshold number of arrays of data values have been processed without updating the attribute data;

determining a processing order for processing a current array of data values according to the attribute data that is stored in the data store before processing of the current array of data values, the attribute data including an array of attribute values respectively corresponding to the current array of data values;

processing the current array of data values according to the determined processing order to obtain a processed array of data values;

decoding the image to generate decoded image data according to the processed array of data values; and updating the attribute data stored in the data store according to the attribute data that is stored in the data store before the processing of the current array of data values and according to the current array of data values, the updated attribute data being for use in determining a processing order in respect of a subsequently processed array of data values.

26. The image data decoding method according to claim 25, wherein the updating the attribute data is performed according to rankings, in magnitude order, of the current array of data values.

27. A non-transitory computer readable medium including computer program instructions, which when executed by a computer causes the computer to perform the image data decoding method of claim 25.

\* \* \* \* \*